United States Patent [19]

Eckhardt et al.

[11] Patent Number: 4,553,620
[45] Date of Patent: Nov. 19, 1985

[54] VEHICLES WITH DIFFERENTIAL SPEED STEERING

[75] Inventors: Erich Eckhardt, Grossumstadt; Karl Schmitt, Sailauf; Wolfgang Grone, Aschaffenburg; Binio Binev, Sulzbach/Main, all of Fed. Rep. of Germany

[73] Assignee: Linde Aktiengesellschaft, Wiesbaden, Fed. Rep. of Germany

[21] Appl. No.: 550,260

[22] Filed: Nov. 10, 1983

[30] Foreign Application Priority Data

Nov. 11, 1983 [DE] Fed. Rep. of Germany ....... 3241793

[51] Int. Cl.⁴ ............................................. B62D 11/04
[52] U.S. Cl. ..................................... 180/6.48; 60/444
[58] Field of Search ................ 180/6.48, 6.3; 60/444, 60/443

[56] References Cited

U.S. PATENT DOCUMENTS 3,946,560 3/1976 MacIntosh et al. ............ 180/6.48 X

FOREIGN PATENT DOCUMENTS 2001701 7/1971 Fed. Rep. of Germany .

Primary Examiner—John A. Pekar
Attorney, Agent, or Firm—Buell, Ziesenheim, Beck & Alstadt

[57] ABSTRACT

Vehicles with differential speed steering are provided having a hydrostatic transmission on each side for driving the drive wheels on that side, a spring-loaded servo piston operating a final control element of each transmission, at least one control pressure pick-off connected to the operating cylinders for controlling forward and backward travel, a pair of second control pressure pick-offs connected with the operating cylinders for controlling turning, a manually controlled pilot valve in a connection between the second control pick-offs and the operating cylinder and a control pressure reducing valve acting on the second control pressure pick-offs reducing the pressure to prescribed characteristics independently of the incoming pressure with respect to the actuation path.

24 Claims, 6 Drawing Figures

VEHICLES WITH DIFFERENTIAL SPEED STEERING

This invention relates to vehicles with differential speed steering and particularly to a control for the drive of a vehicle with differential speed steering and with a hydrostatic transmission or drive unit for the drive of the drive wheels of each side of the vehicle, where the final control element of each of the two drive units is connected with a spring-loaded servo piston capable of sliding in an operating cylinder, in which case a pressure chamber is provided on each side of the servo piston in the operating cylinder and the servo piston can be acted upon by an arbitrarily adjustable control pressure, where at least one control pressure pick-off (one or two of them) is assigned for controlling the forward and backward travel and can be connected with the operating cylinders of the drive unit of the two vehicle sides and each of two additional control pressure pick-offs is assigned to one direction of turning and can be connected with the operating cylinder of the drive unit of the vehicle side on the inside of the turn, where each servo piston for controlling the direction and speed of travel can be acted upon on the one side by the control pressure pick-off assigned to this control and for controlling the turning radius on the other side can be acted upon by a control pressure pick-off of the pair of them assigned to turning, in which case a pilot valve that can be controlled as a function of the switching state of an arbitrarily actuatable direction and speed selection lever is located in the connection line between a control pressure pick-off assigned to the turning and the operating cylinder of the assigned drive unit, through the which pilot valve this control pressure pick-off assigned to turning can be connected with the second pressure chamber of the operating cylinder of the drive unit on the inside of the turn, the second pressure chamber of which is acted upon by the control pressure pick-off determining the control pressure of travel speed and possibly direction, in which case the control pressure pick-off assigned to one direction of turning of the control pressure pick-off pair determining the direction and radius of turning is designed as a control pressure pick-off that with slight actuation first reduces the control pressure in the pressure chamber of the operating cylinder acted upon by the control pressure pick-off determining the direction and speed of travel and furnishes a control pressure only with greater actuation on the opposite side of the servo piston and is connected at least with its pressure-building section for supplying pressure to the outlet of the control pressure pick-off determining the travel speed. Such a control is already quite good, but it still exhibits a few minor deficiencies.

The invention proposes the further refinement and perfection of the control according to the introductory section of claim 1, especially with regard to safety and driving comfort.

This problem is solved according to one step of the invention in that the control pressure pick-off section that initially reduces the control pressure on the first part of the actuation path of each control pressure pick-off assigned to one direction of turning reduces the pressure with prescribed characteristics, independently of the size of the incoming pressure, after a certain prescribed small actuation path. That is, after passing through a slight and definitely prescribed dead path, the pressure is immediatly reduced, proportional to the pedal path, independently of the size of the incoming pressure that is specified by the control pressure pick-off that determines the travel speed; these control pressure pick-offs that reduce the control pressure for steering are designed so that the pressure is immediately modified proportional to the pedal actuation path, independently of the travel speed selected and thus the pressure flowing into the control pressure pick-off, during actuation without a dead path or after passing through the prescribed dead path. In contrast, normal control pressure pick-offs are designed so that the control pressure is proportional to the actuation path on th outlet side, i.e., that if the pressure flowing in is only a fraction of the pressure, on which it can be steered at a higher pressure flowing in, the actuating element must be first displaced without any effect until the adjusted control pressure corresponds to the incoming control pressure. When such a normal control pressure pick-off is used in a control mechanism according to the invention, the result would be that if it is set to a slight travel speed, i.e., the pressure medium flows with a slight control pressure to the control pressure pick-off determining the turning, the pedal had to be depressed substantially to initiate the steering before the steering function begins, while in contrast to this, with a setting to a high travel speed and thus a high incoming control pressure, a steering effect is introduced immediately on the first actuation path of the pedal. Such an action of a steering mechanism imposes high demands on the operator with regard to attention and ability to adapt and thus involves the risk of erroneous reactions.

This control pressure pick-off section is designed particularly advantageously so that it has a valve piston with a two-edged control function that is capable of sliding in a borehole against the force of a spring. One face of this valve piston is acted upon by the control pressure fed in and its other spring-loaded face is acted upon by the pressure acting on the operating cylinder, in which case the spring resting against the displaceable actuation section is not pretensioned or is only slightly so.

In a particularly advantageous embodiment the actuation lever is connected positively with the actuation section and the latter with the valve piston, so that traction forces can also be transferred, i.e., with an arbitrary return of the actuating lever or the latter is pushed back by a sufficiently stiff spring, the valve piston is in any case moved also even if it was jammed by the intrusion of dirt particles.

The use of a control mechanism according to the invention is particularly advantageous in a travel speed control for a vehicle, in particular a track-laying loader or grader, in which the travel speed is controlled by a hand lever and two pedals are provided for controlling the turning, where when one pedal is actuated the vehicle executes a turn toward the side of the pedal actuated. Such control mechanisms are known in themselves for vehicles with hydrodynamic converters. In contrast to drives with hydrodynamic converters, the hydrostatic drives have the advantage that the travel speed can be definitively set and does not change with a variation in the travel resistance. Nevertheless, it is advantageous for the attending personnel that now operate an old track-laying vehicle with hydrodynamic converter and then operate one with hydrostatic drive if the same control system is used for both vehicles.

In a control system according to the introductory portion of claim 1, the problem of increasing operating convenience and especially the safety is solved according to an additional step of the invention by providing at least one additional device for reducing the control pressure. Several such additional devices, preferably with different tasks, can also be present in a control.

In an expedient embodiment the additional device is a pressure-relief valve inserted between the control pressure source, i.e., control pressure pump, and the travel speed control pressure pick-off.

The additional device can have the purpose of introducing or achieving a braking effect, independently of the setting of the actuating lever that controls the travel speed and for this purpose the additional device can be a pressure-relief valve connected with a brake pedal. If the drive regulated by the control is provided with a brake that is loaded by an energy reservoir and can be cleared by hydraulic pressure, the arrangement in an expedient embodiment is designed so that when the brake pedal is actuated, the braking pressure releasing the brake is reduced. This arrangement is conveniently connected with the additional device such that, when the brake pedal is actuated, the pressure-relief vlave is first actuated and the control pressure is thus reduced, so that the hydrostatic drive units are set to lower output r.p.m.'s down to stoppage of the output shaft, and the valve releasing the brake line is actuated only when the actuating lever is moved further.

In a particularly advantageous embodiment the control pressure-relief valve connected with the brake pedal is designed as a control pressure pick-off section that reduces the pressure with prescribed characteristics independently of the magnitude of the incoming pressure with respect to a specific actuation path. Preferably, such a control pressure pick-off section has a valve piston with a two-edged control function that is capable of sliding in a borehole against spring, one face of the valve is acted upon by the pressure fed in and the other face, which is the spring loaded face, is acted upon by the pressure acting on the operating cylinder, in which case the unpretensioned spring rests against the actuating section. An embodiment having a positive connection that facilitates a forced return of the valve piston is not generally required because a dangerous situation cannot arise in the valve releasing the braking action due to stick of the valve piston, however, it may be desirable in the extremely improbable exceptional situations in which it is necessary to accelerate immediately after a braking action. In such a situation, we provide an actuating lever connected in a form locking manner with the actuating section and the latter is connected in the direction opposite the force that the spring exerts on the valve piston by a unilateral positive connection.

According to another embodiment of the invention, the additional device is a safety valve that shuts off the control pressure feed line and connects the control pressure lines leading to the control pressure pick-offs with a pressureless drain, by the actuation of which the drive can thus be safely brought to a stop. This safety valve can be actuated by an arbitrarily actuatable lever that is actuated whenever the vehicle is to be safely stopped, e.g., if the operator leaves the vehicle.

This safety valve can, however, also be connected in the nature of a "dead man control mechanism" with another element, in particular, the driver's seat, so that the drive is positively stopped if the operator can no longer perform his job, e.g., is thrown out of the driver's seat.

In another expedient embodiment the additional device is provided as a maximum load regulator that reduces the control pressure when the r.p.m. of the primary energy source, e.g., reciprocating engine, that drives the drive unit pumps drops below a prescribed minimum value. Such a maximum-load control is known from the DE-PS No. 20 01 701. The combination of such a familiar maximum load control mechanism with a control pressure pick-off section that reduces the pressure with prescribed characteristics independently of the magnitude of the incoming pressure with respect to a specific actuating path, and a supplementary device that lowers the control pressure is particularly advantageous. In such a structure the supplementary device is preferably a pressure relief valve inserted between the auxiliary control pressure pump and the travel speed control pressure pick-off. A multiway valve, whose characteristics correspond to those of a shutter, is expediently used as a maximum-load valve.

When an additional device as just described is used, care must be taken that restrictors are located in the control pressure lines to prevent the control pressure reduced by the pressure-relief valve of the additional device is not again built up by the control pressure pick-off. Therefore, it must be provided according to an expedient embodiment of the invention that the restrictors in the control pressure lines are located in the direction of flow beyond the control pressure pick-offs assigned to the turning control.

In a particularly advantageous embodiment of the invention it is provided that at least the control pressure pick-offs controlling the travel motion, i.e., travel speed, direction, and turning, are located in a control valve block, and preferably that the pressure-relief valve or valves of the additional device are also located in this control valve block, that the levers projecting out of the housing have a favorable position with respect to the actuating elements (hand levers and foot pedals) in the vehicle, i.e., that the control valve block levers are assigned favorably to the actuating elements and can be connected with a minimum of linkage elements, e.g., connecting rods.

One advantage of the control according to the invention is that a quantity-independent control mechanism results and thus a good temperature behavior, i.e., only a slight dependence of the control characteristics on the temperature of the control pressure oil. In contrast, controls in which the filling of the control cylinders is controlled by restrictors are very high temperature-dependent due to the small amounts of fluid flowing through the restrictors into the control cylinders.

The change-over valves, one of which is located between each control pressure pick-off assigned to the turning direction and the operating cylinder, can be hydraulically controlled, depending on whether the control pressure pick-off or pick-offs controlling the travel speed is or are switched to forward or backward travel. In view of the pressure buildup in a hydrualic control mechanism, which requires only a short time, there is more favorable time lapse than if the change-over valves are controlled mechanically directly by the hand lever actuating the control pressure pick-off or pick-offs determining the travel speed or are controlled by the hand lever with auxiliary electric power so that the change-over valve is reversed as soon as a travel direction is selected, before a control pressure that controls a travel speed is built up.

In the foregoing general description of this invention, certain objects, purposes and advantages of the invention have been pointed out. Other objects, purposes and advantages of the invention will be apparent from a consideration of the following description and the accompanying drawings in which.

Figure 1:
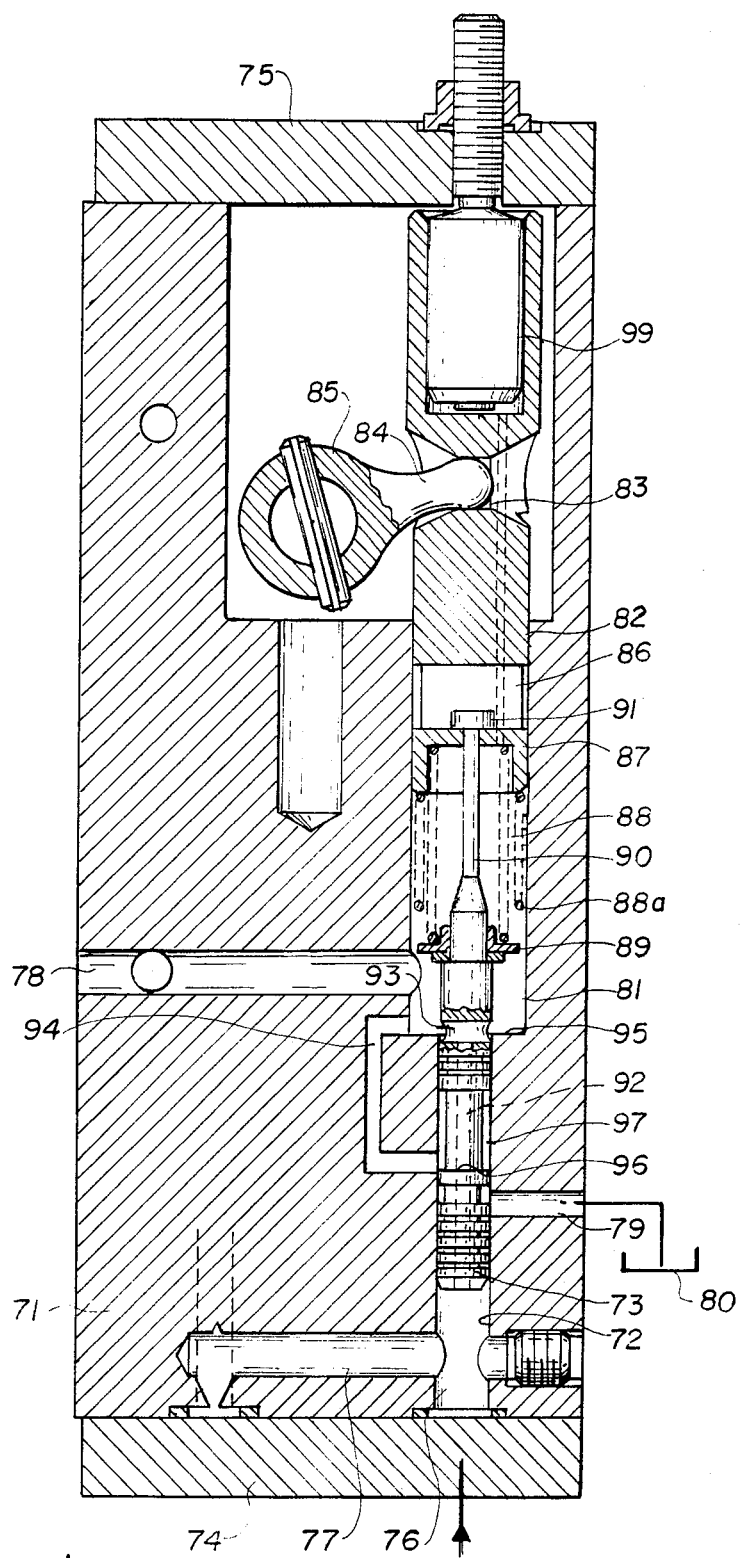
FIG. 1 shows in axial section a pressure-reducing control pressure pick-off for turning.
Figure 3:
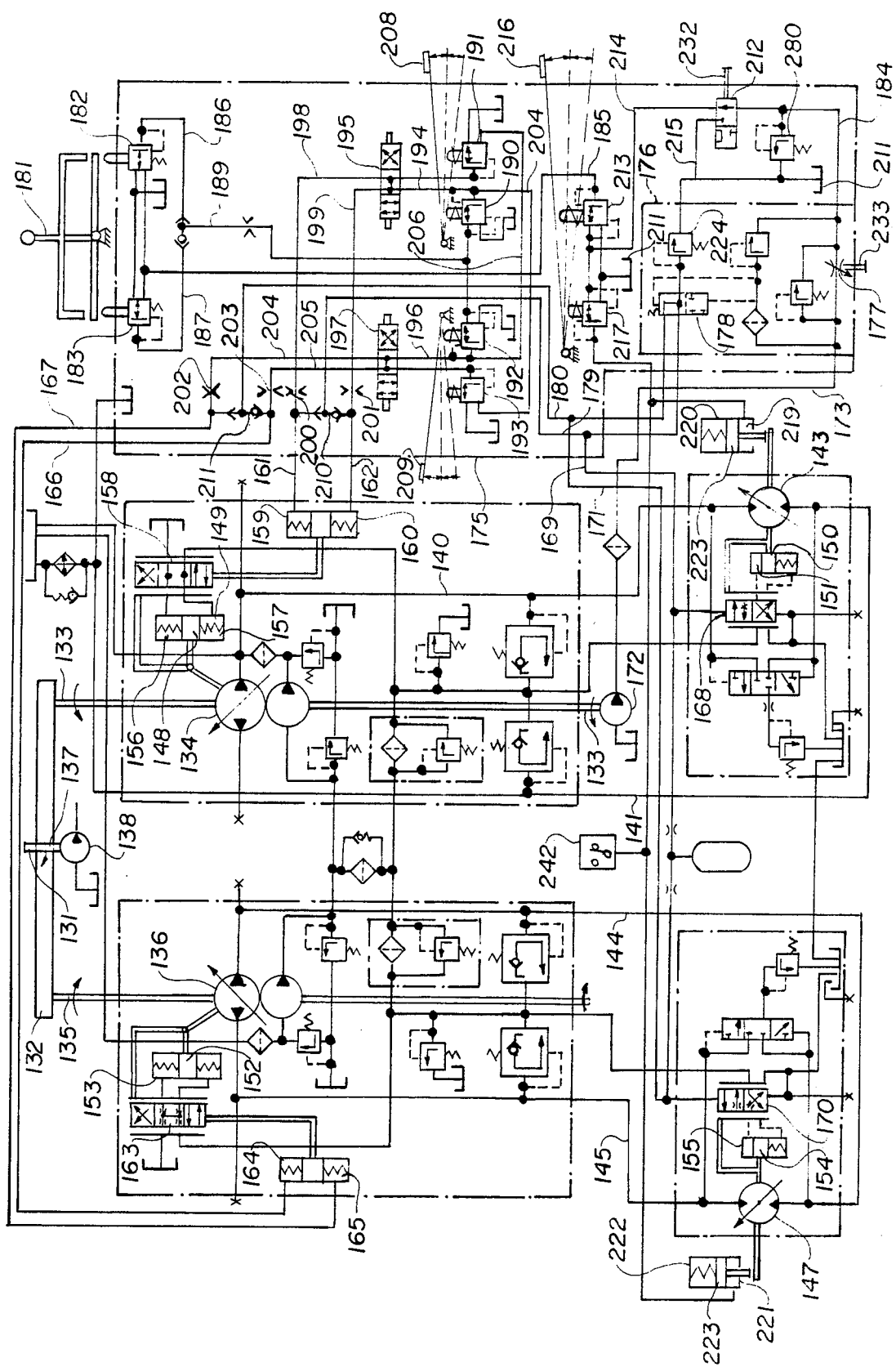
FIG. 3 shows the overall switching plan for a control.

Referring to the drawings, the control pressure pick-off shown in FIG. 1 has a housing 71, in the borehole 72 of which a valve piston 73 is capable of sliding. The housing 71 is closed off by the two end plates 74 and 75. The control pressure fed to the control pressure pick-off is fed through borehole 77 into the pressure chamber 76 of the borehole 72, i.e., the control pressure that comes from the control pressure pick-off that determines the travel speed. The control pressure controlled by the control pressure pick-offs 71, 72, and 73 is conveyed through the borehole 78 over a change-over valve to a pressure chamber of the operating cylinder of the assigned drive unit. The borehole 79 is connected with a pressureless container 80. The borehole 78 is connected with the chamber 81, which on the other hand is closed off in a sealed manner by the actuating section 82, into whose borehole 83 a locking finger 84 of the actuating element 85 is positively inserted. The actuating section 82 has a perforation to which is connected a spring plate 87, against which the spring 88 rests, which in turn rests through a spring plate 89 against the valve piston 73. The valve piston 73 has an extension 90 that projects through a borehole into the spring plate 87 and lies against it with a head 91. Due to the positive insertion of the finger 84 into the borehole 83 the actuating section 82 cannot only be moved downward in the drawing and thus compress the spring 88, but, if the finger 84 is swung counterclockwise, the actuating section 82 and thus the valve piston 73, through the spring plate 87 and the head 91 and the extension 90, is also carried along, due to its lying on the wall of the borehole 83.

The spring plate 89 is in turn supported against a collar of the valve piston 73.

A longitudinal borehole 92 is provided in the valve piston 73; it empties into a transverse borehole 93 and in the position shown in the drawing connects the chamber 81 with the chamber 76. The chamber 81 is connected with the middle section of the borehole 72 through a by-pass channel 94.

In the position shown in the drawing the pressure medium can flow through the borehole 77 into the chamber 76 of the borehole 72 and from here through the borehole 92 and the transverse borehole 93 into the chamber 81 so that the same pressure prevails in chamber 81 as in chamber 76. Because this pressure acts on surfaces of equal size on the valve piston 73, there is no pressure in this situation on the valve piston 73, but only the force of the spring 88, as long as the actuating section 82 is brought into a corresponding position by means of finger 84. If by swinging the finger 84 clockwise the actuating section 82 and thus the spring plate 87 are brought downward in the drawing, the spring 88 presses the valve piston 73 into the borehole 72 until the under edge of the chamber 81 shuts off the borehole 93. An equilibrium state will set in during operation so that when pressure medium flows out through the borehole 78, pressure medium correspondingly flows in between the edges of the transverse borehole 93 and the end surface 95 of the chamber 81. If the finger 84 is swung further clockwise, the actuating section 82 is thus moved further downward and thus the spring plate 87 also moves downward and correspondingly presses on the spring 88 so that the valve piston 73 is moved downward in the drawing until its edge 95 releases the borehole 79, so that pressure medium can flow through the annular chamber 97 around the valve piston 73 from the chamber 81 through the by-pass channel 94, the annular space 97, past the edge 96 into the borehole 79. The compensating piston 99 serves in the usual manner to equalize the forces and has the same diameter as the actuating section 82 in the borehole forming the space 81. The space in front of the one end face of the compensating piston 99 is connected through a longitudinal borehole in the actuating section 82 with the space in front of the lower end face of it in the drawing. On the other hand, the compensatory piston 99 rests against an adjusting screw.

Figure 2:
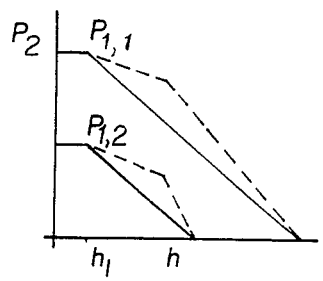
FIG. 2 shows the operating diagram for the control pressure pick-off of FIG. 1.

A function scheme is shown in FIG. 2, where the stroke h of the actuating section 82 is plotted on the abscissa and the pressure $P_2$ present in the borehole 78 is plotted on the ordinate. The upper curve in the drawing results if the pressure $P_{1.1}$ is fed into the borehole 77 and the lower curve in the diagram results in the pressure $P_{1.2}$ is fed into the borehole 77. It can be seen that the pressure reducing effect, i.e., the region in which the pressure in the borehole 78 drops proportionally to the displacement path of the actuating lever 82, always begins at stroke $h_1$, independently of the pressure of the control pressure medium flowing into the borehole 77. The stroke $h_1$ was selected so that a steering function does not set in if an unintentional slight movement of the pedal is effected, but a steering function is unleashed after passing through the stroke $h_1$, independently of the travel speed set. This means that a constant dead path is present for the pedal. The valve responds only after this dead path is passed through.

If a second shorter spring 88a is also incorporated, a broken characteristic curve can be obtained in the familiar manner so that a pressure drop with a flatter curve is achieved only after the dead path is passed through, with the result that turning can be regulated with a slight deviation from course, i.e., with a large turning radius, in a very finely tuned manner. Only with a greater depression of the pedal is there a drop in the pressure with a steeper curve, i.e., a lesser sensitivity or responsiveness.

The drive shaft 131 is driven by an internal-combustion engine (not shown in the drawing) and in turn drives the distributor unit 132 which drives the pump 134 of the right-hand drive unit through the shaft 133, the pump 136 of the left-hand drive unit through the shaft 135, and the auxiliary pump 138 through the shaft 137. The pump 134 is connected through the lines 140 and 141 with the hydraulic motor 143 of the right-hand drive unit and the pump 136 is connected through the lines 144 and 145 with the hydraulic motor 147 of the left-hand drive unit. The final control element of the pump 134 is connected with the servo piston 148, which is capable of sliding in an operating cylinder 149. The final control element of the adjustable hydraulic motor 143 is connected with the servo piston 150, which is capable of sliding in the operating cylinder 151.

The final control element of the adjustable pump 136 is connected with the servo piston 152, which slides in the operating cylinder 153 and the final control element of the adjustable hydraulic motor 147 is connected with the servo piston 154, which slides in the operating cylinder 155.

In the operating cylinder 149 the two pressure chambers 156 and 157 are separated from each other by the servo piston 148 and they are acted upon with pressure medium through the servo control valve 158, which in turn is controlled by the pressure acting on the two pressure chambers 159 and 160, where the pressure chamber 159 is loaded with pressure through the control pressure line 161 and the pressure chamber 160 through the control pressure line 162. Correspondingly, the two pressure chambers in the operating cylinder 153 are acted upon through the servo control valve 163, which in turn is controlled by the pressure loading in the two pressure chambers 164 and 165, in which case the pressure chamber 164 is loaded with pressure through the control pressure line 166 and the pressure chamber 165 through the control pressure line 167.

The servo piston 150 of the hydraulic motor 143 is moveable in operating cylinder 157 against the force of a spring, where the pressure loading of the pressure chamber in the operating cylinder 157 is controlled by the servo valve 168, whose control piston is also moveable against the force of a spring and whose pressure chamber is loaded with pressure through a control pressure line 169. Correspondingly, the servo valve 170, which is assigned to the operating cylinder 155, is loaded with control pressure through the line 171.

The auxiliary control pump 172 is also driven by the shaft 133; it delivers through the control pressure line 173 to the control valve block 175, which contains all the valves used to control the travel movements. A separate section 176, in which the maximum-load regulating elements are located, is built into the control valve block 175.

The delivery line 173 of the auxiliary control pump 172 leads to the arbitrarily adjustable restrictor 177, in front of which a pressure head builds up; its magnitude is dependent on the magnitude of the stream delivered by the auxiliary control pump 172 and thus on the r.p.m. of the shaft 131. The purpose of the maximum-load regulating section 176 is to switch over the change-over valve 178 when the pressure head drops in front of the restrictor 177 and the r.p.m. of the shaft 131 accordingly drops, so that the two control pressure lines 179 and 180 are relieved of pressure.

The lever 181 is an arbitrarily actuatable hand lever that is used to control direction and speed of travel. The kinematics of the lever 181 are designed so that one of the two control pressure pick-offs 182 or 183 can be selectively controlled by it.

These two control pressure pick-offs are loaded with pressure through the line 184, which is connected to the supply line 173 beyond the restrictor 177, and the line 185, to which the two control pressure pick-offs 182 and 183 are connected. A control pressure line 186 goes out from the control pressure pick-off 182 and a control pressure line 187 goes out from the control pressure pick-off 183; they both lead to a change-over valve 188, which automatically connects the one of the two lines 186 and 187 carrying the higher pressure with the line 189.

The control pressure pick-off formed of two partial ones 190 and 191 are connected to the line 189 and the control pressure pick-off formed of the partial ones 192 and 193 is also connected to line 189.

The control pressure line 194 is connected to the partial pick-off 190; it leads to the change-over valve 195. The control pressure line 196, which leads to the change-over multiway valve 197, is connected to the partial pick-off 192. The two change-over multiway valves 195 and 197 are controlled mechanically by the lever 181 (in a manner not shown in the drawing) so that if the lever 181 is in the neutral position, the two change-over valves 195 and 197 are in the position shown.

Two control pressure lines 198 and 199 go out from the change-over valve 195, where the control pressure line 198 continues beyond the restrictor 200 into the control pressure line 161, while the control pressure line 199 continues beyond the restrictor 201 into the control pressure line 162.

Accordingly, two control pressure lines 204 and 205 go out from the control pressure pick-off 197, where the control pressure line 204 continues beyond the restrictor 202 into the control pressure line 167 and the control pressure line 205 continues beyond the restrictor 203 into the control pressure line 166.

The partial control pressure pick-offs 190 and 192 correspond in construction to the valve shown in FIG. 1 and present the characteristics shown in FIG. 2.

The partial control pressure pick-off 191 is connected on the inlet side through the control pressure line 206 to the control pressure line 196 coming from the partial control pressure pick-off 192, and in an analogous manner the partial control pressure pick-off 193 is connected through the control pressure line 207 to the control pressure line 194 coming from the partial control pressure pick-off 190.

The two partial control pressure pick-offs 190 and 191 can be actuated by means of a pedal, where on the first portion of the actuation path (e.g., on the first ca. 60% of the actuation path) of the pedal 208 only the partial control pressure pick-off 190 is actuated or responds, while with further depression of the pedal 208 the partial control pressure pick-off 191 is also actuated or responds. In an analogous manner, the two partial control pressure pick-offs 192 and 193 can be actuated by means of a pedal 209.

A change-over valve 210 is inserted between the two control pressure lines 161 and 162; the control pressure line 179 is connected to its outlet. Analogously, a change-over valve 211, to whose outlet the control pressure line 180 is connected, is inserted between the two control pressure lines 166 and 167.

The line 184 is protected by a relief-valve jet 280, which is connected on the outlet side with the pressureless container 211, with which the valve 178 connects the lines 179 and 180 also in the switching position shown, if the pressure head in front of the restrictor 177 and thus the r.p.m. of the shaft 131 have inadmissibly dropped.

The safety valve 212 and the pressure-relief valve 213 are inserted, one after the other, between the lines 184 and 185; the two are connected together by the line 214.

In the operating status represented in the drawing the safety valve 212 connects the line 184 with the line 214 so that the pressure medium delivered by the auxiliary control pump 172 can flow through the lines 173, 184, 214 and 185 to the control pressure pick-offs 182 and 183. However, if the safety valve 212 is switched in its safety position, it connects the line 214 with the line 215, which leads to the pressureless container 211, so that all the lines leading to the control pressure pick-offs 182 and 183 are relieved of pressure and thus neither the drive units 134 and 143 nor the drive units 136 and 147 can be regulated out of the neutral position.

The quantity of pressure medium per unit of time delivered by the auxiliary control pump ("tachometer pump") 172, not consumed by the control, and which thus is excessive flows back through the relief-valve jet 280 to the reservoir.

A pressure-relief valve 213 is inserted between the lines 214 and 185. The pedal 216 serves to actuate this pressure-relief valve 213, which corresponds in basic construction to the valve shown in FIG. 1 and has the characteristics shown in FIG. 2. That is, if the pedal 216 is actuated, the pressure-relief valve 213 causes the pressure flowing off in line 185 to be reduced with respect to the pressure flowing into line 214 and thus the pressure flowing to the control pressure pick-offs 182 and 183 is reduced. Accordingly, only a lower pressure can be directed through the one of the control pressure pick-offs 182 and 183 that is actuated, with the result that the pressure-relief valve 213 acts as a control pressure relief-valve jet for the overall control 182, 183, 190, 191, 192, 193 and thus when the pedal 216 is actuated, the hydrostatic drive units 134, 143 and 136, 147 can be set to a lower output r.p.m., i.e., if the lever 181 is swung out to select a certain travel speed, a braking action can be achieved by actuating the pedal 216. The kinematics are designed here so that only the pressure-relief valve 213 is actuated first when the lever 216 is actuated on the first part of the path, while with further depression of the pedal 216 the pressure-relief valve 217 is also actuated; the latter is also connected to the line 214 on the inlet side and is connected to the line 218 on the outlet side, the latter line leading to the pressure chamber 219 in the brake cylinder 220 and the pressure chamber 221 in the brake cylinder 222. If the pressure-relief valve 217 is not controlled, the pressure standing in the line 214 is passed through unhindered, so that this pressure is present in the pressure chambers 219 and 221 and displaces the pistons 223, which are connected with a brake loaded by a mechanical spring so that the brake is eased. However, if the pressure in line 218 drops due to actuation of the pressure-relief valve 217, the pressure in the pressure chambers 219 and 221 also drops, such that the pistons 223 are displaced under the action of the force of the springs and the brakes are applied. This action also accordingly occurs if the safety valve 212 is switched over so that it relieves the line 214 and thus pressure no longer flows to the pressure-relief valve 217.

The pressure-relief valve 217 is connected kinematically with the pedal 216 such that only the pressure-relief valve 213 is actuated on the first fraction of the actuation path of the pedal 216, that is, braking is effected through the setting back of the hydrostatic drive unit, while on the second portion of the actuation path of pedal 216 the pressure-relief valve 217 is also actuated and thus the pressure in the brake line 218 is reduced.

The action of the maximum-load regulating device 177, 178 in the maximum-load regulating section 176 is somewhat different in that, if the lines 179 and 180 are connected with the pressureless reservoir 211 and if the pressure drops in the line 180, the one of the two control pressure lines 167 and 166 carrying the higher pressure is connected through the change-over valve 211 with the line 180, so that the pressure is reduced in the one of the two lines 167 and 166 carrying the higher pressure. The action is analogous if the pressure is reduced in the line 179, where the one of the two lines 161 and 162 carrying the higher pressure is connected through the change-over valve 210 with the line 179 such that the drop in the pressure in line 179 induces a drop in pressure in the one of the two lines 161 and 162 that carries the higher pressure. However, because of the valve 224 and the connection to it, the same pressure is present in the lines 179 and 180; the result of this is that if the vehicle is steered to make a turn and the maximum-load regulating device 177, 178 engages, the travel speed is reduced, but not the turning radius that has been set. If the pilot valve 178 is closed, the lines 179 and 180 effect only a connection to the lines 169 and 171, with the result that the pressure chambers in the one connected to the servo valves 168 and 170 are loaded with the same pressure as the one of the two lines 167 and 166 carrying the higher pressure or the one of the two control pressure lines 161 and 162 carrying the higher pressure, through the line 179.

The mode of action is thus as follows: By actuating the lever 181 counterclockwise in the drawing, the control pressure pick-off 183 is acted upon for forward travel, and by actuating the lever 181 clockwise in the drawing, the control pressure pick-off 18a is acted upon. The forward movement is controlled by the control pressure pick-off 183 and the backward travel is controlled by the control pressure pick-off 182. If one of the pedals 208 or 209 is then additionally actuated, the control pressure is first reduced on the first path fraction by the partial control pressure pick-offs 190 or 192, and with further depression of the pedal 208 or 209, pressure is fed to the other of the pressure chambers 159, 160 or 164, 165.

If the pedal 208 or 209 is depressed only so far that the partial control pressure pick-off 190 or 192 is actuated, the drive unit 134, 143 or the drive unit 136, 147 of the side to which the pedal 208 or 209 is assigned is set to a lower output r.p.m., so that the drive is thus slowed down on the inside of the turn, up to stoppage of the drive 134, 143 or 136, 147 assigned to the inside of the turn. If the pedal 208 or 209 is then further depressed, so that the partial control pressure pick-off 191 or 193 is actuated, the drive unit 134, 143 or 136, 147 on the inside of the turn is switched to the opposite direction of travel up to the extreme case where the drive units 134, 143 or 136, 147 of the two vehicle sides rotate oppositely at the same speed and thus the vehicle turns on the spot.

The safety valve 212 can be arbitrarily actuated by a lever 232 and is designed as a 3-connection/2-position multiway valve so that it can be operated only in the two positions described.

Figure 4:
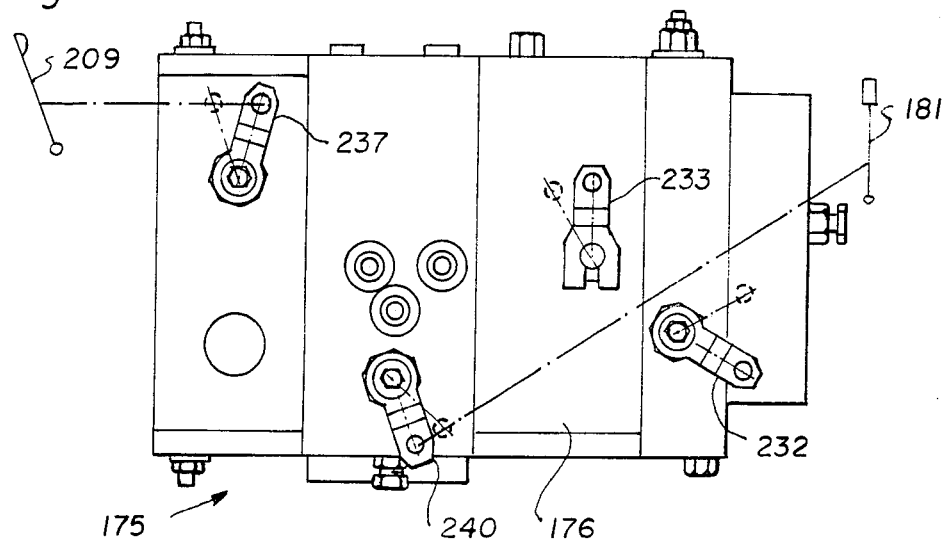
FIG. 4 is a side elevation of a control block for this control.
Figure 5:
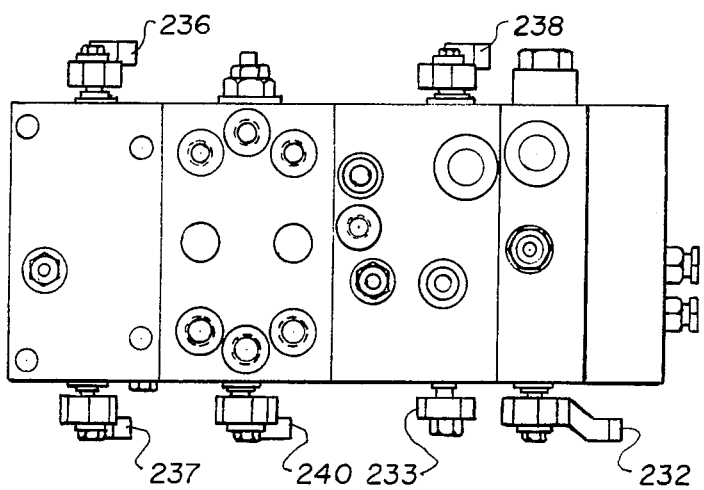
FIG. 5 is a top plan view of the control block of FIG. 4.
Figure 6:
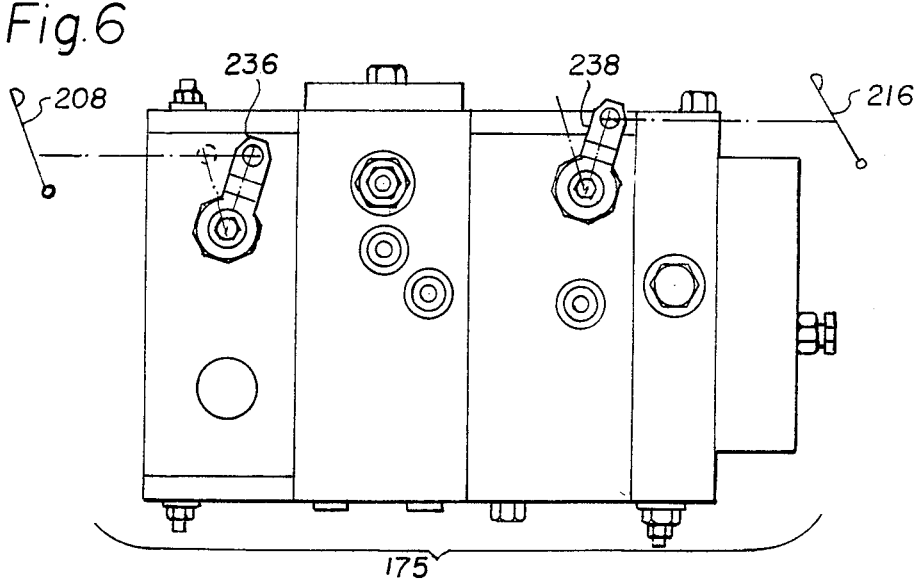
FIG. 6 is a side elevational view of the side of the control block opposite that of FIG. 4.

The overall construction of the control valve block 175 is shown in FIGS. 4, 5 and 6. The lever 236 projecting out of the housing is arranged so that it can be directly connected by a connecting rod with the pedal 208 and the lever 237 projecting out of the housing on the other side with an axis of rotation coaxial to that of the lever 236 is arranged so that it can be directly connected by a connecting rod with the pedal 209. The lever 238 is arranged so that it can be connected by a single connecting rod with the pedal 216. The lever 240 is arranged so that it can be connected in a simple manner with the hand lever 181.

Through the fact that the brake switch 242 is connected directly to the line 218, the brake light or stoplight lights up also when braking through the hydrostatic drive.

In another embodiment (not shown) a single control pressure pick-off can also be provided instead of the two control pressure pick-offs 182 and 183. It is inserted between the lines 185 and 189 and is actuated by the hand lever 181, in which case the two change-over valves 195 and 197 are mechanically controlled by the hand lever 181, so that the direction of travel is determined by its manipulation.

In the foregoing specification, we have set out certain preferred practices and embodiments of our invention, however, it will be understood that the invention may be otherwise embodied within the scope of the following claims.

We claim:

1. A control for the drive of a vehicle with differential speed steering comprising a pair of hydrostatic transmissions for independently driving the drive wheels of each side of the vehicle, a final control element on each of said pair of transmissions movable for controlling the direction and speed of each of said transmissions, a spring-loaded servo piston connected to each final control element for moving said final control element, an operating cylinder slidably carrying said spring-loaded servo piston, a pressure chamber in said cylinder on each side of the servo piston whereby the servo piston may be acted upon by a selectively adjustable control pressure, at least one control pressure pick-off for controlling the forward and backward travel of the vehicle connected with each of the operating cylinders of the hydrostatic transmission on each side of the vehicle, a pair of additional control pressure pick-offs, each one assigned to one direction of turning connected with each of the operating cylinders of the drive unit whereby one servo piston for controlling the direction and speed of travel can be acted upon on the one side representing the inside of the turn by the control pressure pick-off assigned to said control and the other operating cylinder on the other side representing the turning radius can be acted upon by a control pressure from the pick-off on the outside of the turn, a connection between each control pressure pick-off and the corresponding operating cylinder, a pilot valve in said connection, a direction and speed lever connected to said pilot valves whereby the pilot valves are operated to control the flow of fluid to said operating cylinders, and wherein the control pressure pick-off that reduces the control pressure of each control pressure pick-off assigned to a turning direction is a control pressure reducing valve that reduces the pressure with prescribed characteristics following a preselected movement without pressure change and independently of the magnitude of the incoming pressure with respect to the control pressure pick-off that controls travel.

2. In a control for the drive of a vehicle with differential speed steering and with a hydrostatic transmission for the drive of the drive wheels of each side of the vehicle, a final control element of each of the two transmissions connected with a spring-loaded servo piston capable of sliding in an operating cylinder for moving the final control element to control the direction and speed of each of said transmissions, a pressure chamber provided on each side of the servo piston in the operating cylinder, the servo piston acted upon by a selectively adjustable control pressure, at least one control pressure pick-off assigned for controlling the forward and backward travel and selectively connected with the operating cylinders of the transmission of the two vehicle sides, two additional control pressure pick-offs, each one assigned to one direction of turning and selectively connected with the operating cylinder of the drive unit of the vehicle side on the inside of a turn, each servo piston for controlling the direction and speed of travel being acted upon on the one side by the control pressure pick-off assigned to this control, and for controlling the turning radius on the other side, being acted upon by a control pressure pick-off of the pair assigned to turning, a pilot valve selectively controlled as a function of the switching state of an selectively actuable direction and speed selection lever located in the connection line between a control pressure pick-off assigned to the turning and the operating cylinder of the assigned drive unit, said pilot valve connecting this control pressure pick-off assigned to turning with the second pressure chamber of the operating cylinder of the drive unit on the inside of the turn, the second pressure chamber of which is acted upon by the control pressure pick-off determining the control pressure of travel speed and direction, the control pressure pick-off assigned to one direction of turning of the control pressure pick-off pair determining the direction and radius of turning being a control pressure pick-off that with slight actuation first reduces the control pressure in the pressure chamber of the operating cylinder acted upon by the control pressure pick-off determining the direction and speed of travel and furnishes a control pressure only with greater actuation on the opposite side of the servo piston and is connected at least with its pressure-building section for supplying pressure to the outlet of the control pressure pick-off determining the travel speed, the improvement wherein the control pressure pick-off section that reduces the control pressure of each control pressure pick-off assigned to a turning direction is a control pressure reducing valve that reduces the pressure with prescribed characteristics following a preselected movement of said valve without pressure change and independently of the magnitude of the incoming pressure with respect to the control pressure pick-off that controls travel.

3. Control according to claim 1 or 2 characterized in that the control pressure reducing valve has a valve piston with a two-edged control function that is capable of sliding in a borehole against the force of a spring, one face of said piston being acted upon by the pressure fed in and the other, spring-loaded face being acted upon by the pressure acting on the operating cylinder, the spring extending between said other face and an actuating member connected to said direction and speed lever.

4. Control according to claim 3, wherein an actuating lever is connected with the actuating member in a position fixing manner whereby the actuating member may be selectively fixed in position relative to the valve piston.

5. Control according to claim 1 or 2 characterized in that the control pressure pick-off assigned to the control of travel is connected to a hand lever and each of the control pressure pick-offs assigned to the turning control is connected to a pedal.

6. Control according to claim 5, wherein at least the control pressure pick-offs controlling the travel movement are located in a control valve block with control levers for the valve block projecting out of the housing located adjacent to the actuating hand lever and pedal.

7. Control according to claim 1 or 2 having a maximum load regulator that lowers the control pressure.

8. Control according to claim 7, characterized in that the maximum load regulator is a pressure-relief valve inserted between an auxiliary control pressure pump and the travel control pressure pick-off.

9. Control according to claim 8 wherein the maximum load regulator is a pressure-relief valve connected with a brake pedal.

10. Control according to claim 9 having a drive with a brake that is loaded by an energy reservoir and can be released by hydraulic pressure, and wherein a device that reduces the brake pressure when a brake pedal is actuated is provided.

11. Control according to claim 10 having a kinematics that first actuates the pressure-relief valve when the brake pedal is actuated and the valve that reduces the brake pressure on the subsequent acutation path, and connects the brake pedal with the pressure-relief valves.

12. Control according to claim 10 wherein the control pressure reducing valve connected with the brake pedal has the same construction as each of the pressure reducing control pressure pick-offs assigned to turning.

13. Control according to claim 8 wherein the maximum load regulator is a safety valve that shuts off the control pressure feed and connects the lines leading to the control pressure pick-offs with a pressureless drain.

14. Control according to claim 8 wherein the maximum load regulator is a maximum control valve that reduces the control pressure when the drive r.p.m. of the drive unit pumps below a prescribed minimum value.

15. Control according to claim 14 having restrictors in the control pressure lines, and wherein the restrictors are located in the control pressure lines in the direction of flow beyond the control pressure pick-offs assigned to turning control and in front of the connection of the line leading to the maximum load regulator.

16. Control according to claim 8 having restrictors in the control pressure lines, and wherein the restrictors are located in the control pressure lines in the direction of flow beyond the control pressure pick-offs assigned to turning control and in front of the connection of the line leading to the maximum load regulator.

17. Control according to claim 7, wherein the maximum load regulator is a pressure-relief valve connected with a brake pedal.

18. Control according to claim 17 having a drive with a brake that is loaded by an energy reservoir and can be released by hydraulic pressure, and wherein a device that reduces the brake pressure when a brake pedal is actuated is provided.

19. Control according to claim 18, having a kinematics that first actuates the pressure-relief valve when the brake pedal is actuated and the valve that reduces the brake pressure on the subsequent actuation path, and connects the brake pedal with the pressure-relief valves.

20. Control according to claim 18, wherein the control pressure reducing valve connected with the brake pedal has the same construction as each of the pressure-reducing control pressure pick-offs assigned to turning control.

21. Control according to claim 7, wherein the maximum load regulator is a safety valve that shuts off the control pressure feed and connects the lines leading to the control pressure pick-offs with a pressureless drain.

22. Control according to claim 7, wherein the maximum load regulator is a maximum-load control valve that reduces the control pressure when the drive r.p.m. of the drive unit pumps drops below a prescribed minimum value.

23. Control according to claim 22 having restrictors in the control pressure lines, and wherein the restrictors are located in the control pressure lines in the direction of flow beyond the control pressure pick-offs assigned to turning control and in front of the connection of the line leading to the maximum load regulator.

24. Control according to claim 7, having restrictors in the control pressure lines, and wherein the restrictors are located in the control pressure lines in the direction of flow beyond the control pressure pick-offs assigned to turning control and in front of the connection of the line leading to the maximum load regulator.

* * * * *